US 7,269,277 B2
Sep. 11, 2007

(12) United States Patent
Davida et al.

(54) PERFECTLY SECURE AUTHORIZATION AND PASSIVE IDENTIFICATION WITH AN ERROR TOLERANT BIOMETRIC SYSTEM

(76) Inventors: George I. Davida, 2424 E. Weber Pl. #201, Milwaukee, WI (US) 53211; Frankel, 2424 E. Webster Pl. #201, Milwaukee, WI (US) 53211

( * ) Notice: Subject to any disclaimer, the term of this patent is extended or adjusted under 35 U.S.C. 154(b) by 0 days.

(21) Appl. No.: 09/734,432

(22) Filed: Dec. 11, 2000

(65) Prior Publication Data
US 2002/0070844 A1 Jun. 13, 2002

Related U.S. Application Data

(60) Provisional application No. 60/170,672, filed on Dec. 14, 1999.

(51) Int. Cl.
*G06K 9/00* (2006.01)

(52) U.S. Cl. .................. 382/117; 382/116; 382/118; 382/124

(58) Field of Classification Search ........ 382/115–118, 382/124–128, 209, 217; 340/5.52, 5.53, 340/5.82, 5.83; 707/3
See application file for complete search history.

(56) References Cited

U.S. PATENT DOCUMENTS

| 6,070,159 A | * | 5/2000 | Wilson et al. | 707/3 |
| 6,505,193 B1 | * | 1/2003 | Musgrave et al. | 707/3 |
| 6,507,912 B1 | * | 1/2003 | Matyas et al. | 713/200 |

OTHER PUBLICATIONS

Davida et al., "On Enabling Secure Applications Through Off-line Biometric Identification," IEEE Security and Privacy, May 1998, p. 148-157.*
Canetti, "Towards Realizing Random Oracles: Hash Functions that Hide all Partial Information," Advances in Cryptology, 1997, p. 455-469.*
Davida e al., "On the Relation of Error Correction and Cryptography to an Off line Biometric Based Identification Scheme," Nov. 29, 1998, p. 1-10.*

\* cited by examiner

*Primary Examiner*—Vikkram Bali
(74) *Attorney, Agent, or Firm*—Lesavich High-Tech Law Group, P.C.

(57) ABSTRACT

A passive biometric identification and authentication system. An index generation routine is performed which generates one or more indices. During enrollment indices are created and linked to the user's record and/or identity. Indices are generated so that in future readings of the same user, which are similar but not necessarily equal to the enrollment reading, at least one of the indices will be the same. Indices are also used to provide for additional privacy of the user's template.

20 Claims, 6 Drawing Sheets

| Expected: No. of scans | Per bit prob. of error | no. of errors in a 2Kb scan |
|---|---|---|
| 1 | 0.1 | 205 |
| 3 | 0.028 | 58 |
| 11 | 0.000306 | 1 |
| 21 | 0.00000135 | .002 |

Figure 1

PERFECTLY SECURE AUTHORIZATION AND PASSIVE IDENTIFICATION WITH AN ERROR TOLERANT BIOMETRIC SYSTEM

CROSS-REFERENCE TO RELATED APPLICATIONS

This U.S. Non-provisional application claims priority from U.S. Provisional Patent Application 60/170,672, filed Dec. 14, 1999, the contents of which are incorporated by reference.

This application incorporates by reference co-pending application, Ser. No. 09/303,053 with title "A system and method for the identification of users and objects using biometric techniques".

BACKGROUND-FIELD OF INVENTION

This invention relates to biometrics. More specifically it relates to biometric identification, authentication, authorization and diagnostics.

BACKGROUND AND SUMMARY OF THE INVENTION

An Iris scan is a biometric technology that uses the human iris to authenticate users. One technology as described by J. Daugman in "High confidence personal identifications by rapid video analysis of iris texture" in IEEE International Carnahan Conference on Security Technology, pages 50-60, 1992, here termed Daugman92, produces a 2048 bit user biometric template such that any future scan of the same user's iris will generate a "similar" template. By similar, it was meant having an acceptable Hamming distance within a predefined range, usually up-to ten percent of the size of the code (e.g., Hamming distance between original reading and future reading may be in the range from 20 to 200). Moreover, the Hamming distance for the biometric readings of two different users has been shown to be much higher, about 45 percent (or 921 bits).

In general one can think of a biometric reading of a user as a faulty communication channel that may introduce a limited number of errors. Informally the typical biometric system works in the following manner. A user's biometric template is registered. A future reader compares the newly generated template with the registered template to test for closeness. With respect to iris scan technology closeness is measured by the Hamming Distance.

Observe that a biometric identification system which stores the biometric templates in a central database or provides the user's biometric in the clear may not be acceptable to a user, because a user's biometric could be used for unacceptable purposes if the biometric is obtained by an unauthorized individual. A user's biometric can provide information which a user may not want provided readily. For instance, a finger print reading can be used for law enforcement purposes and an eye scan (retinal or iris) may be able to detect medical conditions.

In the patent application 09/303,053 titled "A system and method for the identification of users and objects using biometric techniques", here termed 053 patent, the feasibility of protecting the privacy of a user's biometric and other security features was introduced. It was suggested that providing additional privacy for the user's biometric may provide for stronger user acceptance. (For instance, an iris template can be used by an insurance company to evaluate a medical conditions rather than used for the legitimate identification purpose.)

An additional objective in the 053 patent is to allow protection of a user's biometric information in unprotected devices (such as a magnetic strip) or in a publicly accessible database (such as in a public key certificate). To address scalability concerns, private keys by the user or the reader were not used. Also, encryption is prone to loss of the cryptographic keys from the reader (i.e., the loss of a single key compromises every user).

One of the disadvantages of many biometric identification and authentication approaches is that these systems are based on a compare operation of two like, or similar, iris scans. That is, during registration a scan of the iris is generated and stored. In user identification process, sometimes called the verification process, a new scan is generated by obtaining a new reading from the user. The two scans, the prior one from registration and new reading just performed, are compared. This, however, requires storage of the biometric scan information in a form that may allow the reproduction of all the information from the original (registered) scan. Note, however, this is not a desirable property if one wants to protect the privacy of the user's biometric as described earlier. User acceptance is vital for any biometric system to be effective. However, most systems reveal information about the user in the registration template. Systems based on the iris, or other biometric measurements may be particularly sensitive to revealing health information in the template.

On-line applications secured through the use of biometric authentication typically are based on a push or pull model. In both models, the first step is a user initialization, which occurs when the user's biometric (UB), and other information, is registered with the on-line server. After initialization, when a user wants access that requires biometric identification, a biometric authorization process is performed. At this time the user's biometric is read by a reader. In the push model, the reader transmits (preferably via a private channel) the reading to the on-line server; the on-line server then verifies the validity of the reading based on the user's biometric in the server's directory; and finally the server sends an authenticated acceptance or rejection message back to the reader. In the pull model, the reader requests the biometric from the server, and the reader performs the verification steps after receiving the biometric over an authenticated and, preferably, private channel from the server. In both cases, an authenticated channel is necessary for some communications between the on-line database and the reader. The authentication can also provide for a binding of a user's biometric with some form of authorization, as established by trust relationships between the reader and the on-line database. The online model is not always practical in mobile environments, such as military applications, and are often cost prohibitive since they require expensive wiring for connectivity or costly wireless devices. It should be noted that an off-line system which protects privacy is also applicable to on-line systems where information is stored in an on-line database instead of on storage cards.

What has not been achieved in the art is the ability to uniquely identify an individual in a scalable fashion by using only the biometric input. That is, unique identification is possible from only the information of a biometric reading and no other input from devices such as a card reader or keypad. Though subsequent biometric readings contains significant errors with respect to the original reading, we show how to use a biometric scan as an index in order to provide a scalable passive user identification system. By passive identification system we mean it can uniquely identify a user from among a set of registered users through the use of only a biometric scan and no other input.

In a passive identification system the user is uniquely identified with a reading of that user's biometric and without any other inputs from the user. Hence the user does not provide an ID number or other inputs via a keyboard or a smart card. Once the user's biometric is read, the user must be uniquely identified to obtain user privileges or other data. This may be done by a linear search through a database of registered biometric/user attributes relationship database. However, in practice a linear search is not scalable for applications with a large user base.

In a biometric system, such as iris scan, there exist variances from the original registered reading with a later acquired reading. Because of the variances, it is not possible, in general, to use biometric systems as a scalable passive identification systems. Scalability becomes difficult because if the reading is faulty and lacking any other input from the user due to the passive nature of the identification scheme, the biometric can no longer be an index into a registered template database and therefore only linear searches are generally possible.

What has been achieved in the art is to do a linear search to evaluate which template matches the reading. This however is not scalable. Another approach is to reduce the information in a biometric so that minor errors do not prevent identification from succeeding. However, this approach reduces the information for validation of the individual correctly. This robustness, to get around errors, leaks information allowing for false positives. That is an individual which should have not passed authorization actually does. This can be seen because the more information that is provided in the template the stronger the validation.

We introduce an index generation routine, which allows for locating the template stored in a database. These indices are then constructed at a later time when verification is performed. These indices will then (with high probability) locate the template of the respective biometric that is being verified. This indexing scheme has substantial advantages over other approaches, and enables passive privacy preserving identification.

In addition, our scheme can generate cryptographic keys without the use of additional inputs such as card reader and key pad. This key can further be used as is well known in the art of cryptography as a key encrypting key or for any other cryptographic applications. The technologies of U.S. Pat. No. 5,541,994 and article "Biometric Encryption" edited by Randal Nichols in Chapter 22 of the ICSA Guide to Cryptography allow for the use of a fingerprint biometric process for encryption but there are several concerns with that technology. First additional information, such as filter information, must be provided as part of the key generation process. This information is used to deal with the error properties of biometrics. Second, the security of the technology is not well specified. As an example in "Biometric Encryption" the author(s) argue that their security is based on the one time pad because the filter data is composed with a random string. However, they do not take into consideration other information available to an adversary. For instance, an additional table called a lookup table is available for the adversary. The lookup table defines related "bits" of the transformed biometric input acted upon by the filter that are linked to specific bits of a cryptographic keys. To add robustness against errors, a multitude of points within a single template represent a single bit of the key. Notice that the typical biometric is not random. For instance as in the "Biometric Encryption" use of a fingerprint the fingerprint is not random. A simple test/observation is that one can distinguish a picture of a fingerprint from randomness due to the redundancy in a fingerprint. Though "Biometric Encryption" may argue randomness in encrypting the biometric, because of the table this no longer is the case because of the redundancy in the biometric. An additional problem with a one time pad as used in, for example "Biometric Encryption", is that if an adversary obtains a single key from the filter information that adversary is able to obtain all past and future keys that have been encrypted with the biometric. In practice, cryptography is not broken by cryptographic tools but other hacking methods which obtain the key directly as is known in the art of secure system design.

The embodiment presented here is an identification and authorization system that achieves perfect secrecy, without storing the biometric. Informally, perfect secrecy means that a polynomial time adversary given a registration template is unable to compute any information about the user biometric related to the template.

Index generation provides new infrastructures that have not been identified in the past. For instance, the biometric reader, biometric database and access point may be at different localities. The access point being what provides the user with entry or access. As to where the test of validity of the biometric reading with respect to what is stored in the database is performed, this may happen at any of the three points but prior work has not identified how to achieve validation testing at the access point without revealing significant biometric reading at that point. This invention provides for such infrastructure and processes. Furthermore, index generation enables additional parties to be incorporated into the identification and validation process. One biometric identification system that is in the art is the iris scan such as "Biometric personal identification and system based on IRIS analysis", U.S. Pat. No. 5,291,560 though others are know in the art such as retinal, fingerprint, handwriting, face recognition, DNA etc. Moreover, non-biological object may also be identified using the biometric technology and we use the term biometric in this aspect even though these may not be biological.

SUMMARY

The present invention comprises a biometric scan, possibly error prone, index generation from subset of scan and passive user identification/authorization. The present invention further comprises a biometric scan, possibly error prone, index generation from subset of scan and verification by untrusted verifiers. The present invention further comprises a biometric scan, possibly error prone, index generation from subset of scan and generation of cryptographic keys.

DRAWING FIGURES

FIG. 1 is a table representing how majority decoding reduces errors.

FIG. 2 denotes an infrastructure for biometric system.

FIG. 3 denotes a protocol within a biometric infrastructure presented in FIG. 2.

PREFERED EMBODIMENT

Figure 2:
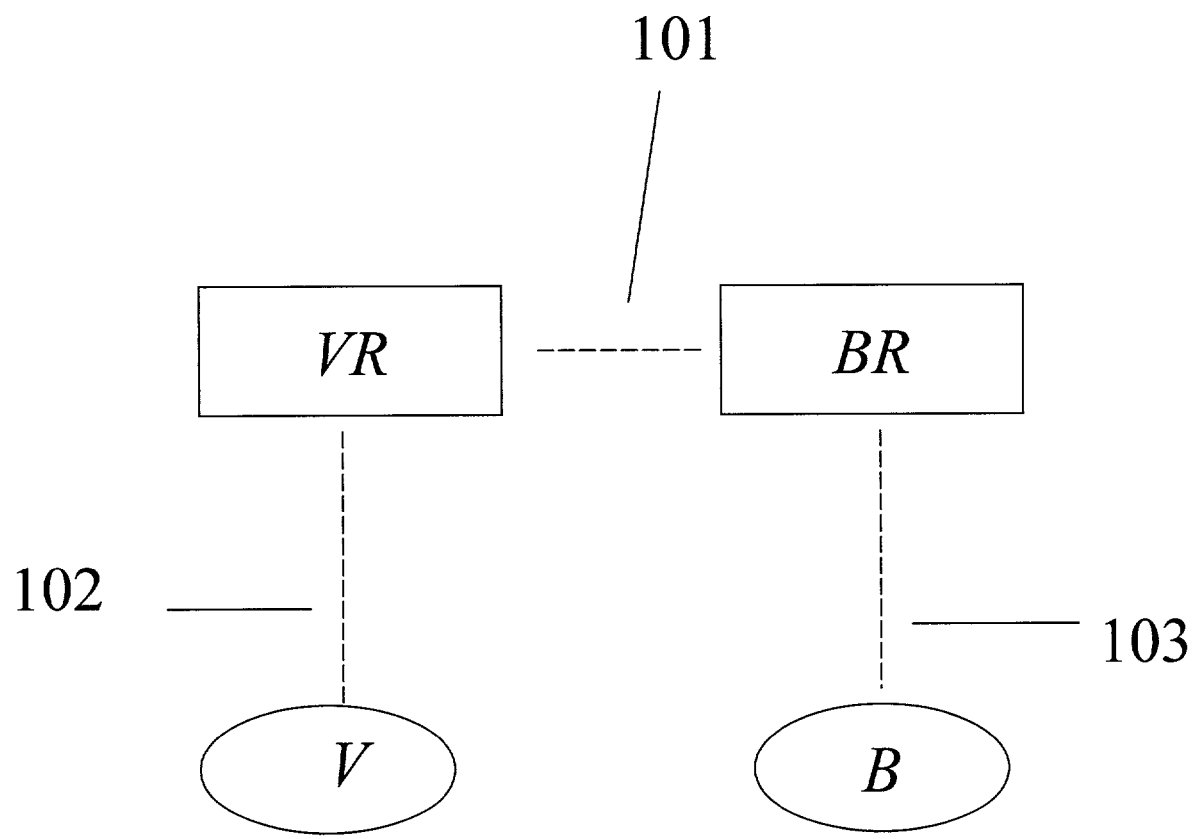

In this invention, the iris scan technology is used as an example to demonstrate a specific form of a biometric scanning. However the use of iris scan is not meant to be limiting. One biometric identification system that is in the art is the iris scan such as "Biometric personal identification and system based on IRIS analysis", U.S. Pat. No. 5,291,560 though others are know in the art such as retinal, fingerprint, handwriting, face recognition, DNA etc. Moreover, non-biological object may also be identified using the biometric technology and we use the term biometric in this aspect even though these may not be biological. The human iris is the colorful doughnut-shaped organ surrounding the pupil, as distinguished from the retina, which is the hemispherical organ behind the cornea, lens, iris and pupil. The iris has highly detailed texture and is unique for each individual, differing between identical twins and between left and right eyes of the same individual. It has been determined that the iris imparts the same or better singularity to individuals as the fingerprint. It is known in the art how to acquire an iris scan of an individual. For instance in Daugman92 it is stated: "acquiring an image of an eye of the human to be identified" and "isolating and defining the iris of the eye within the image, wherein said isolating and defining step includes the steps of: defining a circular pupillary boundary between the iris and pupil portions of the image; defining another circular boundary between the iris and sclera portions of the image, using arcs that are not necessarily concentric with the pupillary boundary; establishing a polar coordinate system on the isolated iris image, the origin of the coordinate system being the center of the circular pupillary boundary, wherein the radial coordinate is measured as a percentage of the distance between the said circular pupillary boundary and said circular boundary between the iris and sclera; and defining a plurality of annular analysis bands within the iris image". In filing U.S. Ser. No. 09/303,053 titled "A system and method for the identification of users and objects using biometric techniques" was developed based on iris recognition.

For the purpose of this invention, a biometric is generally a measurement of a feature, generally a feature of a human such as an iris but it can also extend to inanimate objects and other items. For inanimate objects the "feature" may be a man-made pattern affixed to an object in an inseparable manner, and readable. For example, a pattern on car, or a credit card, can be viewed as a "biometric", if that pattern is unforgeable and not easily replaceable. However the invention is not limited to biometrics from individuals and biometrics is examplary. It may be related to identifying or providing authorization for users by having an electronic template which is verified later to attest to the correctness (i.e., closeness) of a subsequent validation to the future validation. An entity (user) may be physical or electronic. It may be an eminition such as brain wave, electrical signals from a electrical device (e.g., a cellular phone), handwritting from a person, signature, persons voice, faxes, a digital representation of a document, etc. Here we use the term biometric broadly to incorporate all these notions.

As in the filing U.S. Ser. No. 09/303,053 it is not limited to only identification and authorization but rather to other attributes as well. It allows for the enabling of cryptography by allowing templates of objects (e.g., users) to be made into cryptographic keys. These keys can be used with other operation or act as PIN for access, etc.

Primitives

We now discuss error correcting primitives which are known in the art of computer science and electrical engineering and more specifically one familiar with communication theory and communication channels. These primitives are exemplary and not meant to be limiting.

Let Vec $(v_i)=(v_{i,1}, v_{i,2}, \ldots, v_{i,n})$ be n bit code vectors. Given odd M vectors Vec($v_i$), a majority decoder computes vector Vec(V)=($V_1, V_2, \ldots, V_n$), where $V_j$=(majority($v_{1,j}, \ldots, v_{Mj}$)) i.e., $V_j$ is the majority of 0's or 1's of bit j from each of the M vectors. We shall use majority decoding primarily as an example on how to get the best biometric reading possible, thus reducing the Hamming distance between two successive final majority-decoded vectors Vec($V_1$) and Vec($V_2$). Hence, given an n-bit iris code (n=2048 for example), majority decoding may be used on a sufficient number of samples to reduce the expected number of errors to a small number, e.g. 1 per block of 2048 bits. The table in FIG. 1 demonstrates reduction of errors due to multiple scans of an iris.

Other mechanisms may be used with or without majority decoding to reduce the errors in the code. Filtering of errors using signal processing technologies and optical mechanisms are example mechanisms that provide for the sharpening and/or correction of the read template.

An [n, k, d] code is a code of n bit codewords (vectors) where k is the number of information digits and d is the minimum distance of code. Such a code can correct at least t=(d−1)/2 errors. Those knowledgeable in the art of electronic communications and computer science are familiar with error correction in its application for reliable electronic data transmissions over various communication channels such as airwave and telephone lines.

We allow for different types of error correction including both linear and non-linear also codes may be in various algebraic domains though typically in GF($2^m$). In some cases error correction may not even be needed. Error correction protocols are known in the art. If precision can be made low enough then error correction is not even necessary.

We assume, but not require, that the decoding performed at the point of verification is to correct at most (d−1)/2 errors. This ensures that no bogus biometric is decoded into a valid one. Bounded distance decoding can be readily implemented through a simple count of the Hamming weight of the error vector computed. In some decoding schemes, the error locations that are computed are the roots of some polynomial σ(z) over GF($2^m$) of degree t'=degree (σ(z)). If t'>t=(d−1)/2 then the biometric is rejected.

Depending on the application, bounded distance decoding may not be necessary. This is dependent on the type of errors, the number of errors, type of code and many other factors. There are several ways known in the art to do bounded distance decoding.

This background on error correction is not intended to be limiting to specifically the technology of error correcting theory but it is used to present some of the known techniques in which reduction of errors are performed. Primarily error correcting codes demonstrates a method of error correction which additional information, oftentimes called check digits or redundancy, is stored in additional to the data to allow for future correction of data.

Description-Index Generation Function

Let Vec(T) be a template (e.g., a biometric template).
GEN-index function:
1. Set j=0

2. Set j=j+1 let $X_j$=PermutedChoice(j, Vec(T)) be I-SIZE bits of the biometric Vec(T) selected with schedule PC, where I-SIZE is chosen so that the entropy of the $X_j$ bits is sufficient (e.g. For an iris scan as described above if I-SIZE=600 bits, then, assuming that the biometric has an entropy of 160, the entropy of $X_j$, on average, satisfies $H(X_j)$=53).

let $I_j$=hash($X_j$)

3. if (j<D) goto 2 else exit.

These indices $I_j$ are pointers to the database locations where the user templates are stored. Collisions with other iris codes is dealt with by performing the checks to be described later.

We observe that when hash($^{108}$) has the same information hiding property as those used in G. I. Davida, Y. Frankel, and B. J. Matt "On enabling secure applications through off-line biometric identification" In 1998 *IEEE Symposium on Security and Privacy*, pages 148-157, 1998 here termed DFM. (e.g., R. Canetti "Towards realizing random oracles: Hash functions which hide all partial information" In *Advances in Cryptology. Proc. of Crypto '97*, pages 455-469, 1997 here termed Cannetti) and $X_j$ has sufficient entropy, the $I_j$ leak no useful information about the iris. Hashing is not always necessary if there is no privacy constraints then then storing $X_j$ may be better. If hashes are not preferred other mechanisms are possible as well that are known in the art of cryptography. For instance a public key encryption, preferably deterministic such as RSA, or a keyed private key (pseudorandom function) may be used as well.

We note that the use of iris scan is exemplary. Any system in which one is able to reduce errors can be used and majority decoding is at least one example. Note that removal of all errors is not necessary here. In fact, what is taught here is how to take any index which is partial erroneous and developing a way to search through a database effectively and in a scalable manner so that the errors do not prevent the finding of the record.

Biometric as a Key:

Observe that where the index is used and the index reveal little to no information about the biometric than this index itself can be used as a key to enable something else. For instance, to enable a cryptographic operation (e.g., any operation which requires secret information such as a pin for access control or an encryption function.). See the 053 patent for some discussion about this area.

Operation

Other mechanisms may be used with or without majority decoding to reduce the errors in the code. Filtering of errors using signal processing technologies and optical mechanisms are example mechanisms which provide for the sharpening and/or correction of the read template. Once a reduced-error iris code is obtained, we construct D indices $I_j$, $1 \leq j \leq D$ from I-SIZE subsets of Vec(T) with the GEN-Index function is performed.

Whether stated or not we assume all messages may be encrypted and/or authenticated using public key or private key technology. It should be noted that additional PINS and security measures may be incorporated into the messaging as well.

Operation

The use of indices in the manner defined above allows for multiple applications in various infrastructures.

Operation-Passive Identification

In a passive identification system the user is uniquely identified with a reading of that user's biometric and without any other inputs from the user. Hence the user does not provide an ID number or other inputs via a keyboard or a smart card. Once the user's biometric is read, the user must be uniquely identified to obtain user privileges or other data. This may be done by a linear search through a database of registered biometric/user attributes relationship database. However, in practice a linear search is not scalable for applications with a large user base.

In a biometric system, such as iris scan, there exists variances from the original registered reading with a later acquired reading. Because of the variances, it is not possible, in general, to use biometric systems as a scalable passive identification systems. Scalability becomes difficult because if the reading is faulty and lacking any other input from the user due to the passive nature of the identification scheme, the biometric can no longer be an index into a registered template database and therefore only linear searches are generally possible.

As discussed above, we note that using majority decoding with iris scan technology one is able to reduce the number of errors to a negligible amount. This is based on observations that the errors in successive readings of a biometric differ in positions that are randomly distributed over the iris code, with about 10 percent hamming distance between success readings, on the average. Assuming that the errors are random over the code: they can be reduced through majority decoding of M independently read iris code vectors. Other methods may as well be used to make the reading more precise. For instance, better optics, improved template encoding, lighting, and filtering technology. Here majority decoding is an example of a technique known to have many of the desired properties that is both effective and efficient.

Let Vec(T) be the template for an individual who presents to the authorization center. For each such user, we construct D indices $I_j$, $1 \leq j \leq D$, of size I-SIZE as described above, which are pointers to the location of the record. Standard hashing techniques can be used to produce the indices.

We now define the following identification and authentication system:

To register, M biometric templates of length k are independently generated for the legitimate user. Majority decoding is then applied to the M biometrics to obtain the user's k bit template Vec(T). Given the k information digits Vec(T), an n digit codeword Vec(T)||Vec(C) is constructed, where Vec (C) are the check digits, in the [n, k, d] code defined at system setup. In the secure database the following information is stored:

Name of the individual, NAME.

Other public attributes ATT, such as the issuing center and a user's access control list.

The check digits Vec(C), of the biometric.

Hash(NAME,ATT Vec(T)||Vec(C)) where Hash(˙) is a partial information hiding hash function as in Cannetti (note Hashes, private key authentication etc. can be used instead depending on the security model).

The database is set up so that the indices $I_1, \ldots, I_D$ created from Vec(T) with the GEN-Index function link to the created record.

Passive Identification Process:

During verification, when a user presents herself/himself, the verification unit performs the following steps 1. Set i=0, M biometric templates are independently generated for the user. Majority decoding is applied to the M biometric vectors to obtain the user's k bit template Vec(T').
2. Set i=i+1, Construct index $I_i'$ with the GEN-Index function on input Vec(T').
3. The records pointed to by indices $I_i'$, containing the check digits and hash value, are requested. Let Vec($C_i$) be the check digit in record indexed by $I_i'$. Each set of check digits Vec($C_i$) is then used along with Vec(T') to produce a new corrected biometric Vec($T_i''$).
4. The hash value Hash(NAME, ATT, Vec($T_i''$)∥Vec(C)) is then compared for equality with the hash value received.
5. If success, exit (success)
6. If i<D go to 2 else exit(failure)

Successful verification implies the user passed the identification step. The NAME and the ATT fields identify the user uniquely. Observe that with overwhelming probability at least one of the indices will be correct. In fact, there will most likely be multiple indices pointing to the same record. To reduce the number of queries into the database those records pointed by the most indices should be tested first.

Note as discussed before a hash is not necessarily the best technique. Several variations are possible as long as they are consistent with information in the database and in particular the indices. e.g., if indices do not use a hash but rather are cleartext then T need only be sent. It should be observed that the actual verification component (step 4) can be performed at multiple places (e.g., database locality, reader locality, etc.). The above is not intended to be limiting.

Operation-Perfect Secrecy

Here we use a technique very similar to the passive identification to enable perfect secracy. Define PRF(.,.) to be a Pseudo Random Function with two inputs. We obtain D indices as before but this time we store on the user token D tuples ($R_j$, Vec($C_j$)), for $1 \leq j \leq D$, where $C_j = PRF_{I_j}(R_j) \oplus$ Vec(C) and $R_j$ is a random string. This in essence encrypts Vec(C ) under each of the keys $I_j$.

System Setup:

The authorization center generates its public and private keys and disseminates its public key to the biometric readers. The system also sets up an [n,k,d] code.

User Initialization:

To register, M biometric templates of length k are independently generated for the legitimate user. Majority decoding is then applied to the M biometrics to obtain the user's k bit template Vec(T). Given the k information digits Vec(T), an n digit codeword Vec(T )∥Vec(C ) is constructed, where Vec(C) are the check digits, in the [n,k,d] code defined at system setup. Let $I_1, \ldots, I_D$ be the D indices chosen as described above. A record (stored on a token to be carried by the user) is constructed with the following information:

1. Name of the individual, NAME.
2. Other public attributes ATT, such as the issuing center and a user's access control list.
3. <$R_j$, Vec($C_j$)>, $1 \leq j \leq D$, where Vec($C_j$)=PRF$_{I_j}$($R_j$)⊕ Vec(C ),$I_j$ are D indices of size I-SIZE and $R_j$ is a random string.
4. $Sig_j$=Sig(Hash(NAME,ATT,Vec(T)∥$C_j$)), $1 \leq j \leq D$, where Sig(x) denotes the authorization officer's signature of x, and Hash(˙) is a partial information hiding hash function such as Cannetti (e.g., Sig(Hash(˙)) is a content-hiding signature) or a random oracle such as M. Bellare and R. Rogaway. "Random oracles are practical: a paradigm for designing efficient protocols". In *Proceedings of the 1st ACM conference on Computers and Communications Security*, 1993 here termed BR.

Biometric Verification Process:

When a user presents herself/himself and the card with the information described above, the following steps are performed 1. set j=0

M biometric templates are independently generated for the user. Majority decoding is applied to the M biometric vectors to obtain the user's k bit template Vec(T').

2. j=j+1

Compute $I_j'$ with the GEN-Index function on input Vec(T').

Compute Vec($C_j'$)=PRF$_{I_j'}$($R_j$)⊕ Vec($C_j$).

Apply error correction on codeword Vec(T')∥Vec($C_j'$) to obtain the corrected biometric Vec($T_j''$).

3. The signature $Sig_j$=Sig(Hash(NAME,ATT, Vec($T_j''$) ∥$C_j$)) is then checked. [Note: Hashes, private key authentication etc. can be used instead of signature depending on the security model] A successful signature verification implies the user passed the identification step. exit(success)
4. If i<D go to 2 else exit(failure)

Informally, the reasons this scheme attains perfect secrecy are: Observe that ($R_1$, $C_1$), . . . , ($R_D$, $C_D$) are multiple encryptions each of Vec(C) with a key (index) with sufficient entropy. That is each key has around 53 bits entropy, as discussed above, but more can be added. Now each of the keys (indices) $I_j$ operates on a random $R_j$ to provide independence amongst the tuples. If a random oracle rather than pseudo-random function is used then the random values $R_j$ are not necessarily needed.

Note that a password (PIN) may be used as a key instead of the $I_j$ or they can be used to add to the entropy. It should be noted that the technique has similarities to that in DFM in which the template (or components of it) and a PIN are used as an encryption key.

It should also be noted that PRF$_{I_j}$($R_j$)⊕ Vec($C_j$) may be replaced by other functions and the intent is not to be limiting. Rather f($I_j'$)⊕Vec($C_j$) by be used where f is a hash function. Even better is for a cryptographic hash function or any hash function which preserves as much entropy as possible. In fact this hash function works very well as long as it preserves as much entropy as the the binary length of Vec($C_j$). Thereby, providing complete security because the outputs will be equally likely. Though reduction of the security requirement is possible though not advised.

Operation-Passive Identification With Untrusted Verifier

In the passive identification protocol above the reader performed the final verification process. That is it verified the signature. If it is desired that this verification step be performed by the central database holder, without leaking information about the user's biometric, then using a random oracle model we can solve this problem by combining the presented techniques.

Figure 4:
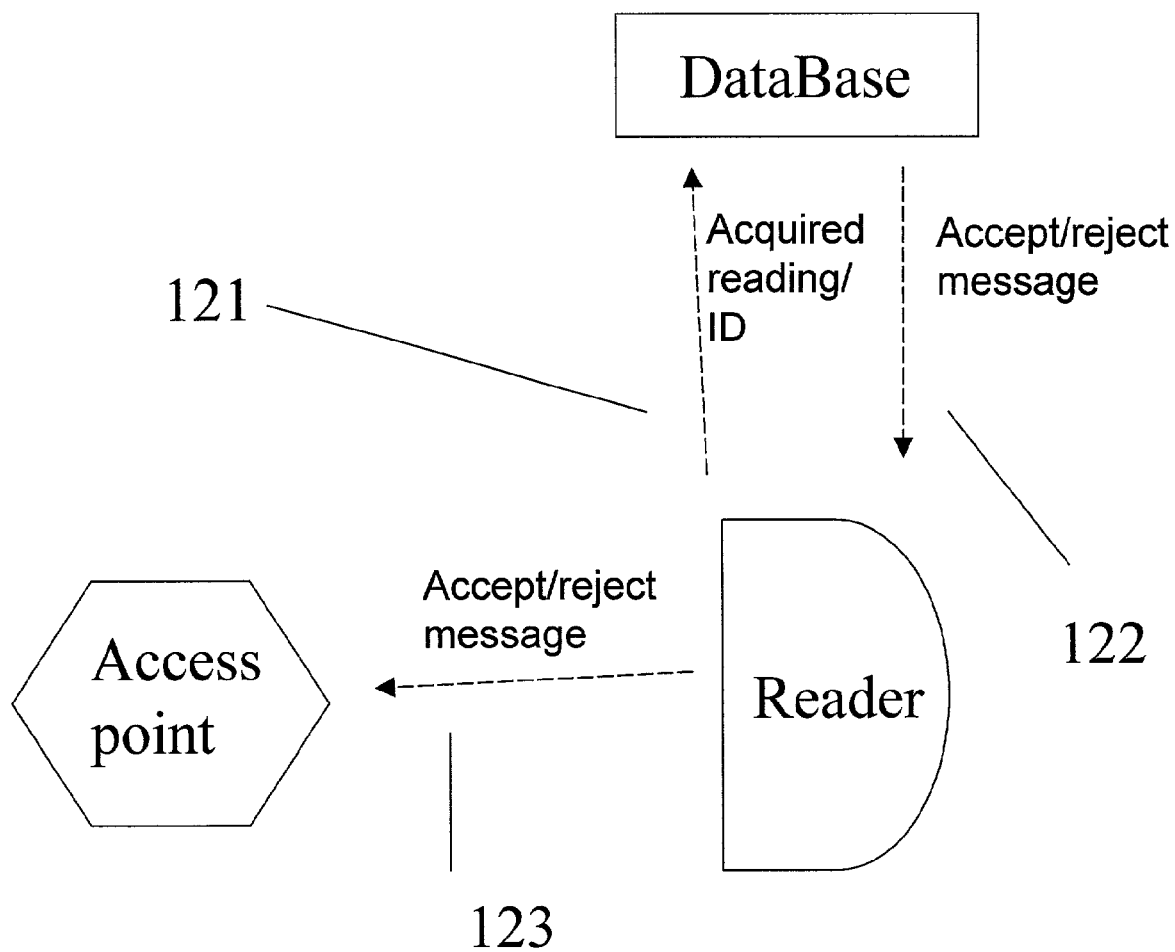
FIG. 4 represents a validation protocol with accept/reject validation test performed at the reader.

Let us look at some example architectures for an untrusted verifier models. In FIG. 4, the reader sends the template to the database in message 121. Upon receipt the database verifies the entry in its database for the user and returns a possibly authenticated message to the reader in 122 expressing whether validation of biometric with information at Database has been accepted. If a valid statement is given then the reader may express the acceptance to the access point (e.g., a door, a program, etc. ) representing what the valid biometric allows one to do. Oftentimes we refer the reader as the access point but is not always the case. With an untrusted verifier, we prefer that the database and/or access point components do not learn anything about the user's biometric.

Figure 5:
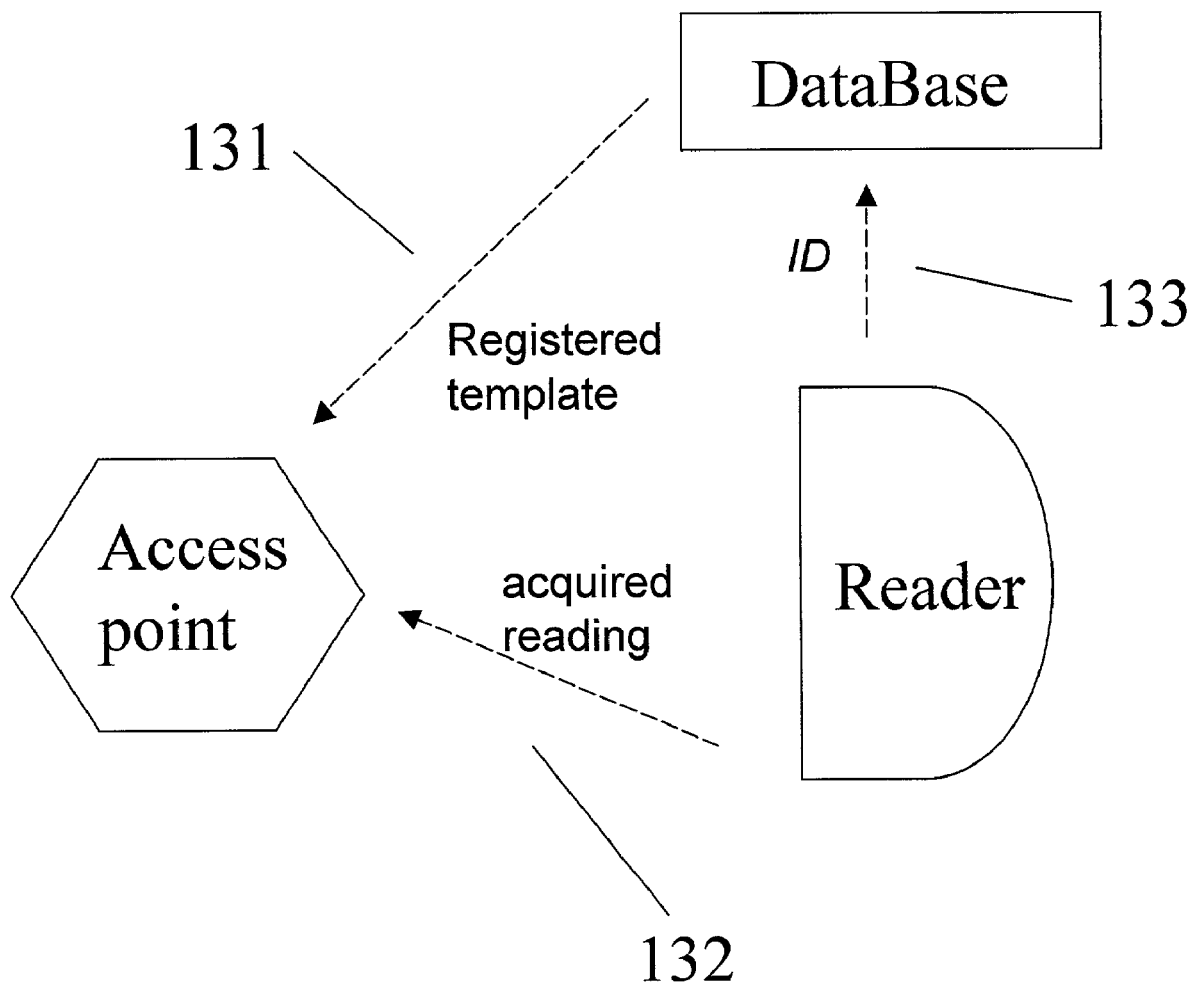
FIG. 5 represents a validation protocol with accept/reject validation test performed at the access point.

Similar issues in FIG. 5. Note here 133 represents a the reader sending a pointer (e.g., id) of user to the database and the database returns a template to the access point in 131. Now, the reader does not send the newly acquired biometric info to the database but rather directly to the access point in 132. The access point now does the validation step given info from the database and the reader. With an untrusted verifier in this model we prefer that the database and/or access point components do not learn anything about the user's biometric.

We note that the notion of database and access point are used very generically in this patent. The database is abstraction representing some entity which has some means of obtaining the registered template where as the access point is just the permission, output, etc. that validation provides. The notion of access point is here is an abstraction to demonstrate that the process may be broken down into subcomponents and, it may not be used in a real application or it may be divided into multiple components.

Hence what we show is that even an entity which is not given access to the biometric reading that it can do the actual verification similar to step 3 in the previous section. Why is this important, first the reader may not be capable of performing a difficult cryptographic operation such as a signature and would like someone else to perform this verification. Hence, the database has no information useful to it but it also can do the cryptographic operation. Also, there may be other parties involved 1) the reader, 2) a database and 3) the access point. The access point being the place (e.g., a door, software mechanism, etc.) which allows access if allowed to the entity after appropriate verification. One can see that it can do this final verification by being given the appropriate information from the other parties.

As in the passive identification, indices are generated and a user's information is stored in a manner which allows the indices to point to the appropriate data. However, this time the user information is different:

System Setup:

The authorization center generates its public and private keys and disseminates its public key to the biometric readers. The system also sets up an [n,k,d] code.

User Initialization:

To register, M biometric templates of length k are independently generated for the legitimate user. Majority decoding is then applied to the M biometrics to obtain the user's k bit template Vec(T). As in the GEN-Index function, let $X_j$=PermutedChoice(j, Vec(T)) be the I-SIZE random bits of the vector Vec(T). Now, for RO(·), a random oracle (see BR), let $Vec(T_j)=Vec(T) \oplus RO(``0''\|X_j)$ and $I_j=RO(``1''\|X_j)$. Given the k information digits $Vec(T_j)$, an n digit codeword $Vec(T_j)\|Vec(C_j)$ is constructed, where $Vec(C_j)$ are the check digits, in the [n,k,d] code defined during setup. In the database we store at a location pointed to by indices $I_j$:

1. Name of the individual, NAME.
2. Other public attributes ATT, such as the issuing center and a user's access control list.
3. The check digits of the encrypted biometric: $C^j$, $1 \leq j \leq D$.
4. D hashes Hash(NAME,ATT,$Vec(T_j)\|C_j$)$1 \leq j \leq D$, where Hash(·) is a partial information hiding hash function as in Cannetti [Other functions such as a signature may be used as well].

Biometric Verification Process:

When a user presents herself/himself, M biometric templates are independently generated for the user. Majority decoding is applied to the M biometric vectors to obtain the user's k bit template Vec(T'). As in the GEN-Index function, let $X'_j$ be the I-SIZE bits of Vec(T) selected using schedule PC, as described above. The reader sends to the database server tuples ($I_j$, $Vec(T_j')$) where $Vec(T_j')=Vec(T')\oplus RO(``0''\|X_j')$ and $I'_j=RO(``1''\|X'_j)$. The server finds the user's records from the $I'_j$. Error correction is performed, for each i, on codeword $Vec(T_1')\|Vec(C_i)$ to obtain the corrected biometric $Vec(T_i'')$ by the database server. The hashes Hash (NAME,ATT,$Vec(T_i'')\|C_i$) are then checked. Successful verification implies the user passed the identification step. For simplicity of exposition, we assume that occasional rejection of a valid user is acceptable (the user would simply repeat the scan). In applications where rejection of a valid user is not acceptable, the parameters of the system can be changed so that such an event has negligible probability. The reader is then informed of the success or failure of the verification by the central server.

Observe that the $C_j$ leak no information because all possible $T_j$ are equally likely given that RO(·) is a random oracle. For correctness, observe that for valid user u with subsequent reading Vec(T') has an error vector $Vec(E)=Vec(T)\oplus Vec(T')$. Suppose $X_j$ is the "index" without any errors. Then performing error correction on $Vec(T')\|C_j=Vec(T)\oplus Vec(E)\oplus RO(``0''\|X_j)\|C_j$ returns $Vec(T_j'')\|C_j$ because Vec(E) has low hamming weight. Also note that we use two different random oracles RO("0",·), for the indices, and RO("0",·), for the keys to encrypt a users template. This allows us to use the same bits of the template in two ways without leaking the key (i.e., RO("0"$\|X_j$)) for a key and index RO("1"$\|X_j$)).

Computationally Simple Passive Identification:

Using the same idea as described above a computationally simpler and heuristicly secure mechanism can be constructed. At the setup process vectors $Vec(T_j)=Vec(T)\oplus RO(``0''\|X_j)$ and $I_j=RO(``1''\|X_j)$, $1 \leq j \leq D$, are stored. In the biometric verification process Vec(T') is obtained as before. Vectors $Vec(T_j')=Vec(T)\oplus RO(``0''\|X_j')$ and $I_j'=RO(``1''\|X_j')$, where $X_j'$ is created from Vec(T') as before, using a Permuted Choice schedule, are now created. Acceptance occurs when there exists a $Vec(T_j)$ whose Hamming weight is sufficiently close to the retrieved vector $Vec(T_j)$, retrieved with $I_j'$. Observe in all the perfect security schemes no additional information is leaked if different authorization centers uses different parameters (e.g., PermutedChoice, [n,d,k] code, random oracle, etc.).

In the non-passive case when the user is allowed to provide some information to the reader (e.g., a magnetic strip card containing error correction bits for the user's template), to provide for an untrusted verifier then as in DFM a hashed biometric template regenerated by the reader can then be used as a key. This key can be used as an authentication key for a challenge response where challenge is generated by the untrusted verifier. That is, let K=RO(Vec (T)) be stored by the untrusted verifier (see also the 053 patent for how these keys can be generated e.g., using say universal one way hash functions). Verification is response $f_K(C)$ where C is a challenge from untrusted verifier or generated by a random oracle, at the reader, with some one-time tag (i.e., using inputs such as time, date, random values, names, etc.).

In the above random oracles are exemplary and other mechanisms known in the art of cryptography are possible. Pseudorandom function, hash, public and private key encryption etc. are all useful.

What is shown above is an interesting new technique in which a message, i.e., a vector, is randomly mapped to a new element in a manner in which close elements are also randomly mapped to a new element but with similar distance. This is a distance preserving for close element mapping. Moreover, the mapping is random. The mapping M can be thought of as satisfying two properties: 1) the mapping M of input a goes to a random element in the range (similar to the notion of a pseudorandom function, or a random oracle) and 2) closeness of close elements (i.e., for elements a,b if distance(a,b)=x then distance(M(a),M(b)) is approximately (or equal to) x). The technique has applications outside of identification and authorization.

Operation-FIG. 2

There exists various infrastructures that one can use to incorporate the technology presented. Though such infrastructure is not required and its presentation is not meant to be the only possible infrastructure possible. In FIG. 2, an entity V is a verifier of biometric templates and VR a representative for V. The dashed line 102 represents the trust relationship between the two entities. Let B be a subject with a biometric and BR a representative for B. Also assume that BR may hold the template of B in some cases (e.g., online models). The dashed line 103 represents the trust relationship between the two entities. Now suppose BR and VR trust each other (say due to a public key infrastructure that they both belong to). The dashed line 101 represents the trust relationship between the two entities. To have authenticated and/or private communication entities defined by a trust relationship (e.g., denoted by 101, 102, 103) may have established some key agreement/initialization protocol using a public key infrastructure (e.g., letting each party know the public key of the other) or private key mechanism (e.g., establishing shared private keys). These key establishment/agreement are typical initialization known using techniques known in art of cryptography and data security. There may be additional parties such as middlemen between each of 101, 102, and 103. There may also be established trust between V and B.

Figure 3:
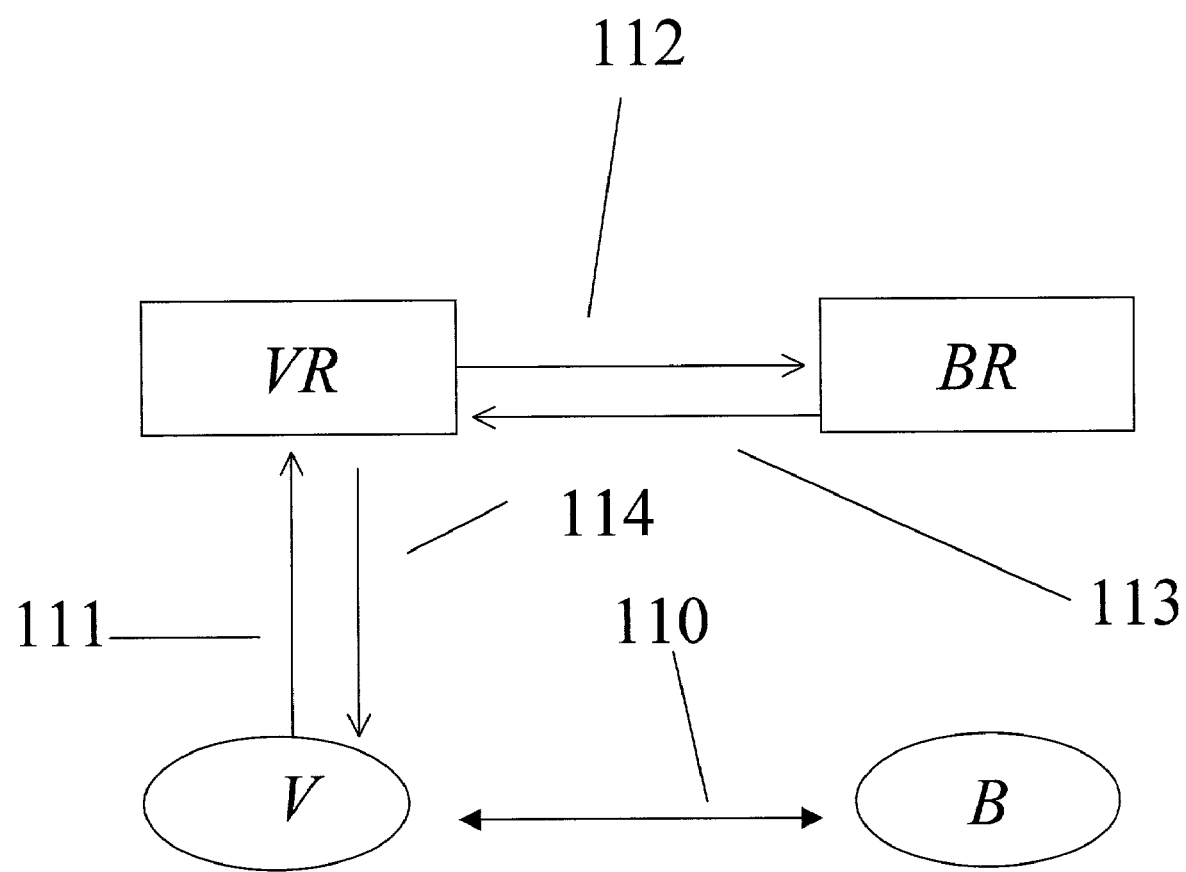

Operation-FIG. 3

FIG. 3, represents an exemplary message flow for the infrastructure presented in FIG. 2. In 110 V gets a reading of B. To verify B then V request through a possibly cryptographically authenticated message (denoted 111) to verify B. VR requests B's template in 112 and receives a verification template of B from BR in 113. Upon receipt of the biometric VR send verification template in 114 to V where upon verification is completed. Observe that the verification template was sent to VR and V yet neither learns any information about B's biometric unless they obtain that information directly from B. That is 113 and 114 do not need to leak information about B's biometric (though we allow it if the system is not attempting to secure the biometric data of the user). Observe that BR may also not have any knowledge about B's biometric information; it just has a template used for verification.

Figure 6:
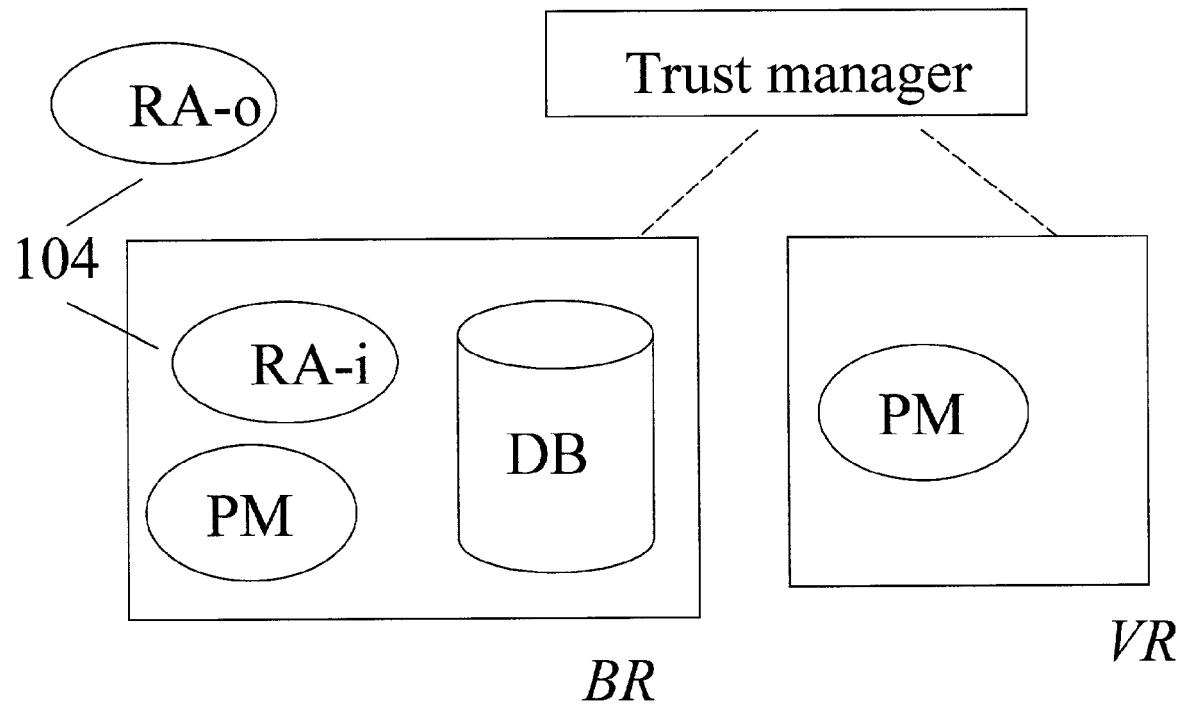
FIG. 6 represents a more detailed view of components of VR and BR.

Operation-FIG. 6

FIG. 6 represents a more complete description of the setup of both BR and VR though additional components may exist. BR has a database DB containing templates and a policy manager PM supporting policies (i.e., who should be allowed access to DB such as which VR are trusted, which users are allowed in DB, accepted RA, etc.), There may be internal or external registration agents (see 104) which represent agents (security officers) who register users. Notice that if the outside register agent is used to generate the template then BR may not learn anything about B's biometric information, it only has a template for validation. VR similarly has a policy manager issues such as which V it represents, which BR it trusts etc. A trust manager may help in establishing trust between BR and VR. The TM may be a Certification authority, a Kerberos server or some other security mechanism to establish trust amongst the parties.

Let us discuss a simple protocol that uses this infrastructure. In 110 V gets a reading of B. To verify B then V request through a possibly cryptographically authenticated message (denoted 111) to verify B. VR requests B's template in 112 and receives a verification template of B from BR in 113. Upon receipt of the biometric VR send verification template in 114 to V where upon verification is completed. Observe that the verification template was sent to VR and V yet neither learns any information about B's biometric unless they obtain that information directly from B. That is 113 and 114 do not need to leak information about B's biometric (though we all it if the system is not attempting to secure the biometric data of the user). Observe that BR may also not have any knowledge about B's biometric information, it just has a template used for verification.

Note that there are several variations to this. The actual verification of a biometric with the template can be performed at several places. At V as described above (i.e., 114 contains a template). However VR can do the actual verify. Now V sends not only the request but also a biometric reading in 111. Then VR receives the template from BR and gets the verification template from BR in a possibly authenticated and/or encrypted message in 113. Now upon validation by VR using biometric info received in 111 and template from 111, a possibly authenticated message is returned to V in 114 telling the status of the check.

As well BR can do this validation when V sends not only the request but also a biometric reading in 111 which is then forwarded to BR in 112 with a possibly authenticated and/or encrypted message from VR. Now upon validation by BR a possibly authenticated message is returned to VR in 113 telling the status of the check. Similarly VR sends a possibly authenticated and/or encrypted message to V in 114.

This infrastructure may be recursive V may be a representative for something else. As well V can be broken up into multiple parts VI which does the reading, and V2 which obtains answer of the validation requests. The infrastructure and flows can be very similar to that which is described in Y. Frankel, D. Kravitz, C. T. Montgomery and M. Yung, Beyond identity: warranty-based digital signature transactions. Financial Cryptography. (Lecture Notes in Computer Science 1403), pages 561-575, Springer-Verlag, 1998 here termed FKMY.

All messages may or may not be authenticated or encrypted. We allow for all types of templates to be used—those that hide bio information as well as those that do not. We allow for PINs and additional security measures to be incorporated into the system at any point.

What is important here is that V and B may not have a mechanism to trust each other or in-fact V and BR where BR is the entity that registers B. But one can use intermediate parties to resolve the distrust where middle parties attest to information generated other parties. In essence providing associativity to the trust. For example V trusts VR and VR trust BR hence there in some cases mechanisms to V to trust BR. This may be by VR being online as in the above discussion. VR may be offline as well if it acts say as a certification authority (as is known in the art of cryptographic and data security). It can certify public key of both BR and V or just one as the case necessary (usually only BR is necessary).

It should be noted that one can incorporate fees into this structure as well. Say BR is paid for each request, etc. In all the above, payment whether as an incrementor in an account, credit card, electronic payment system (e-cash, etc. as is known in the art of data security) are all possible and taught here. These fees can exist at multiple places (e.g., the reader, the database, point of final verification, registration, etc.).

All the above processes can be used with validation templates in the form of the 053 patent or this continuation.

These infrastructure issues are not only for identification or validation but also for possible key generation to enable cryptographic operations as discussed above. The keys generated may be certified or exist in other infrastructures both public key and private keys. A good private key example is Kerberos. The intent is that these techniques presented in this embodiment can be incorporated in a wide variety of infrastructures.

The above embodiment is exemplary and not intended to be limiting.

CONCLUSION, RAMIFICATION AND SCOPE

Accordingly, the reader will see that in my biometric system can be used to provide for a scaleable method of passive identification even when subsequent reading of a biometric introduce errors. The biometric system has the additional advantages in that It provides a strong level of security of user private biometric information.

It maintains the strength of accurate validation even with the error tolerant nature of the process.

It permits inclusion of additional entities in a biometric identification, authentication and authorization infrastructure and system process.

It allows for biometrics for key protection and generation.

Although the description above contains many specifities, these should not be construed as limiting the scope of the invention base as merely providing illustrations of some the presently preferred embodiments of this invention. For example, the majority decoding coding can be replaced with signal processing technologies; biometric can include inanimate objects; information hiding hashes can be other forms of hashes, biometric inputs may use only subset of actual input, etc.

Thus the scope of the invention should be determined by the appended claims and their legal equivalents, rather than by the examples given.

We claim:

1. A passive identification system, comprising:
    a body part input means for dynamically generating an information signal impressed with characteristics of a body part generated directly from the body part and not read from other inputs, wherein the information signal includes one or more generation errors based on variances of the body part;
    an index generation means for dynamically generating one or more indices from the information signal, wherein the one or more indices are generated by processing the information signal by selecting only a portion of the information signal such that generation errors based on variances of the body part are determined to be within a pre-determined error level within the selected portion of the information signal and generating the one or more indices using only the selected portion of the information signal, wherein the generated information signal and the one or more dynamically generated indices are not stored in the passive identification system and the one or more dynamically generated indices reveal no information about the identity of body part thereby providing perfect secrecy; and
    a linking means to link via a trusted link at least one of the dynamically generated indices to an identity for the body part stored in a secure database.

2. The passive identification system of claim 1 wherein an index from the one or more indices of said index generation means is a function of a subset of data of the information signal.

3. The passive identification system of claim 1 wherein said index generation means comprises means to generate said one or more indices from different partial information from said selected portion of the information signal or transformation of said selected portion of the information signal.

4. The passive identification system of claim 1 wherein said information signal is an information signal impressed with characteristics of a body part including a human eye.

5. The passive identification system of claim 1 wherein the index generation means includes dynamically generating one or more indices from the information signal by generating the one or more indices as hash values using a pre-determined hashing function on the information signal.

6. The passive identification system of claim 1 wherein the one or more indices generated from the information signal cannot be used to reveal information about the characteristics of the body part included in the information signal.

7. A private biometric identification system, comprising:
    a body part input means for dynamically generating an information signal impressed with characteristics of a body part, wherein the information signal includes one or more generation errors based on variances of the body part and wherein the information signal is generated directly from the body part and not read from other inputs;
    an index generation means for dynamically generating one ore more indices from the information signal by selecting a only portion of the information signal such that generation errors based on variances of the body part are determined to be within a pre-determined error level within the selected portion of the information signal and generating the one or more indices using only the selected portion of the information signal, wherein the generated information signal and the one or more dynamically generated indices are not stored in the passive identification system and the one or more dynamically generated indices reveal no information about the identity of body part thereby providing perfect secrecy;
    an information hiding means for hiding at least one index to obtain transformed biometric templates;

a transmission means for transmitting at least one transformed biometric template and index pair via a trusted link; and a verification means for verifying the transformed biometric template with template linked by associated index via a secure database.

8. The private biometric system of claim 7 wherein said information signal is generated from multiple readings of said body part.

9. The private biometric identification system of claim 7 wherein said information hiding means includes a transformation of said information signal exclusive-ored with an index.

10. The private biometric identification system of claim 7 wherein said verification means further includes is a hamming weight test.

11. The private biometric identification system of claim 7 wherein said verification means further includes validation for authorization.

12. A private biometric information system, comprising:
a body part input means for generating an information signal impressed with characteristics of a body part to create a biometric and wherein the information signal is generated directly from the body part and not read from other inputs;

an index generation means for dynamically generating one ore more indices from the information signal by selecting a only portion of the information signal such that generation errors based on variances of the body part are determined to be within a pre-determined error level within the selected portion of the information signal and generating the one or more indices using only the selected portion of the information signal, wherein the generated information signal and the one or more dynamically generated indices are not stored in the passive identification system and the one or more dynamically generated indices reveal no information about the identity of body part thereby providing perfect secrecy:

a transmission means for transmitting one or more indices from the index generation means via a trusted link to a secure database, for transmitting a biometric template indexed by said one or more indices to accept points, and for transmitting transformed biometric templates generated by an information hiding means to an access point; and a verification means of said transformed biometric templates to determine an identity for the body part via the secure database.

13. The private biometric identification system of claim 12 wherein said biometric template includes at least one said index composed with said information signal.

14. The passive identification system of claim 12 wherein the index generation means includes applying error correcting codes to reduce errors in the information signal before dynamically generating one or more indices from the information signal.

15. The passive identification system of claim 14 wherein the error correcting codes include computing roots of a polynomial $\sigma(z)$ over a Galois Field $GF(2^m)$.

16. A method for passive biometric identification, comprising:

dynamically generating an information signal impressed with characteristics of a body part, wherein the information signal includes one or more generation errors based on variances of the body part and wherein the information signal is generated directly from the body part and not read from other inputs;

selecting a portion of the information signal such that generation errors based on variances of the body part are determined to be within a pre-determined error level within the selected portion of the information signal;

processing the selected portion of the information signal to remove errors thereby creating a processed information signal;

dynamically generating one or more indices from the processed information signal, wherein the generated information signal and the one or more dynamically generated indices are not stored in the passive identification system and one or more indices dynamically generated from the information signal cannot directly be used to reveal information about the body part or an identity associated with the body part included in the processed information signal thereby providing perfect secrecy;

obtaining a biometric template via a secure database using the one or more generated indices, wherein the biometric template includes an identity for the body part; and verifying the identity for the body part in the biometric template using the one or more generated indices.

17. The method of claim 16 wherein the step of processing the selected portion of the information signal to remove errors includes processing the information signal with error correcting codes by computing roots of a polynomial $\sigma(z)$ over a Galois Field $GF(2^m)$.

18. The method of claim 16 wherein the step of dynamically generating one or more indices includes dynamically generating the one or more indices as hash values using a predetermined hashing function on the processed information signal.

19. The method of claim 16 wherein the one or more indices generated from the processed information signal cannot be used to reveal information about the characteristics of the body part included in the information signal.

20. The method of claim 16 wherein the information signal is an information signal impressed with characteristics of a body part including a human eye.

* * * * *